(12) United States Patent  
Sapozhnikov et al.

(10) Patent No.: US 11,875,828 B2  
(45) Date of Patent: Jan. 16, 2024

(54) MAGNETIC STORAGE READER HAVING A BRIDGE TO ALIGN MAGNETIC MOMENTS

(71) Applicant: Seagate Technology LLC, Fremont,, CA (US)

(72) Inventors: Victor B Sapozhnikov, Minnetonka,, MN (US); Taras Grigorievich Pokhil, Arden Hills,, MN (US); Mohammed Shariat Ullah Patwari, Edina,, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/046,359

(22) Filed: Oct. 13, 2022

(65) Prior Publication Data

US 2023/0122220 A1    Apr. 20, 2023

Related U.S. Application Data

(60) Provisional application No. 63/255,797, filed on Oct. 14, 2021.

(51) Int. Cl.  
*G11B 5/39*    (2006.01)  
*G11B 5/11*    (2006.01)

(52) U.S. Cl.  
CPC .............. *G11B 5/3912* (2013.01); *G11B 5/11* (2013.01); *G11B 5/398* (2013.01); *G11B 5/3932* (2013.01); *G11B 2005/3996* (2013.01)

(58) Field of Classification Search  
None  
See application file for complete search history.

(56) References Cited

U.S. PATENT DOCUMENTS

| | | | |
|---|---|---|---|
| 6,005,753 A * | 12/1999 | Fontana, Jr. et al. | G11B 5/3903 360/324.2 |
| 6,381,107 B1 * | 4/2002 | Redon et al. | G11B 5/3912 360/319 |
| 6,952,328 B2 * | 10/2005 | Hasegawa | G11B 5/3903 360/324.12 |
| 8,125,746 B2 | 2/2012 | Dimitrov et al. | |
| 8,760,820 B1 | 6/2014 | McKinlay et al. | |
| 8,873,203 B2 * | 10/2014 | Hoshino et al. | G11B 5/3912 360/319 |
| 9,076,468 B1 | 7/2015 | Keener et al. | |
| 9,478,239 B2 | 10/2016 | Sapozhnikov et al. | |
| 9,536,549 B1 * | 1/2017 | Ge et al. | G11B 5/3912 |
| 10,381,032 B2 | 8/2019 | Le et al. | |
| 10,586,562 B1 | 3/2020 | Sapozhnikov et al. | |
| 10,614,838 B2 | 4/2020 | Sapozhnikov et al. | |
| 10,783,907 B1 | 9/2020 | Sapozhnikov et al. | |
| 11,380,355 B2 * | 7/2022 | Garfunkel et al. | G11B 5/3912 |
| 2007/0217084 A1 * | 9/2007 | Xue et al. | G11B 5/3903 360/324.12 |

(Continued)

Primary Examiner — Craig A. Renner  
(74) Attorney, Agent, or Firm — Mueting Raasch Group

(57) ABSTRACT

A reader of a magnetic recording head includes a sensor stack, a first side shield and a second side shield disposed on opposite sides of the sensor stack in a cross-track dimension, and a bridge. The bridge is configured to align magnetic moments of the first side shield and the second side shield. The bridge is disposed above the sensor stack relative to a media-facing surface of the magnetic recording head and proximate to the first side shield and the second side shield.

20 Claims, 7 Drawing Sheets

(56) References Cited

U.S. PATENT DOCUMENTS

| | | | |
|---|---|---|---|
| 2008/0186640 A1* | 8/2008 | Matsubara et al. | G11B 5/3932 360/324.12 |
| 2009/0190268 A1* | 7/2009 | Machita et al. | G11B 5/3932 360/319 |
| 2009/0290264 A1* | 11/2009 | Ayukawa et al. | G11B 5/3932 360/319 |
| 2016/0163338 A1* | 6/2016 | Ho et al. | G11B 5/3912 360/75 |

* cited by examiner

MAGNETIC STORAGE READER HAVING A BRIDGE TO ALIGN MAGNETIC MOMENTS

This application claims priority to U.S. Provisional Patent Application Ser. No. 63/255,797, entitled "SHIELDING STRUCTURE FOR A MAGNETIC STORAGE READER" and filed Oct. 14, 2021, the entire contents of which are hereby incorporated by reference.

TECHNICAL FIELD

The disclosure relates to a reader of a magnetic recording head for data storage and retrieval.

BACKGROUND

A magnetic recording head of a hard disk drive (HDD) includes a reader and a writer. The reader may be magnetic sensor that operates on magnetoresistance, such as a giant magnetoresistance (GMR) junction or a tunneling magnetoresistance (TMR) junction. A GMR or TMR junction generally includes three or more layers, with at least two of these being magnetic layers (e.g., ferromagnetic, ferrimagnetic, antiferromagnetic). A magnetoresistive magnetic sensor operates on the principal that resistance across the sensor junction changes with relative orientations of the magnetic moments of two or more layers of the sensor junction. That is, a change in external magnetic field, such a field from a stored data bit on a magnetic disk, may be detected as a change in voltage across or current through a sensor junction, and this change may be processed as a signal to decode the data stored on the magnetic disk. Readers typically include side shields. While the magnetic sensor of a reader is positioned to detect a magnetic field from a data bit on a magnetic disk, the side shields serve to isolate the magnetic sensor from magnetic flux from adjacent data bits, thus improving the signal resolution of the reader. Canting of the magnetic moments in the side shields may produce instability in the magnetic sensor, affecting the read signal and reducing the signal-to-noise ratio.

SUMMARY

The present disclosure describes a shielding structure of a reader of a magnetic recording head. The shielding structure includes a bridge disposed proximate to side shields and above a sensor stack of the reader. The side shields serve to shield one or more layers of the sensor stack (e.g., a free layer, which orients in response to a magnetic field from a stored data bit) from external magnetic fields and/or fields from stored bits on adjacent tracks of the magnetic disk. The side shields may be structured to maintain an oriented internal magnetic moment in the absence of external magnetic fields. For example, the side shields may have magnetic moments which are parallel to a cross-track direction and to a surface of a proximal magnetic disk. This oriented moment may induce a parallel magnetic moment orientation or bias of a layer of the sensor stack (e.g., a free layer) which serves as a baseline moment in the absence of external fields or a field from a magnetic disk. The bridge serves to align the magnetic flux along each of the side shield inner edges, potentially mitigating field canting in the side shields and providing the sensor stack with a more stable baseline bias and better resolution of read signals from stored data bits.

In one example, a reader of a magnetic recording head includes a sensor stack; a first side shield and a second side shield disposed on opposite sides of the sensor stack in a cross-track dimension; and a bridge configured to align magnetic moments of the first side shield and the second side shield, wherein the bridge is disposed above the sensor stack relative to a media-facing surface of the reader and proximate to the first side shield and the second side shield.

In another example, a reader of a magnetic recording head includes a sensor stack; a first side shield and a second side shield disposed on opposite sides of the sensor stack in a cross-track dimension; and a bridge configured to align magnetic moments of the first side shield and the second side shield, wherein the bridge is disposed above the sensor stack relative to a media-facing surface of the reader and between the first side shield and the second side shield, and wherein the bridge is separated from the sensor stack by a gap in a dimension substantially perpendicular to the media-facing surface of the reader.

In another example, a reader of a magnetic recording head includes a sensor stack; a first side shield and a second side shield disposed on opposite sides of the sensor stack in a cross-track dimension; and a bridge configured to align magnetic moments of the first side shield and the second side shield, wherein the bridge is disposed above the sensor stack, the first side shield, and the second side shield relative to a media-facing surface of the reader, and wherein the bridge is separated from the sensor stack by a gap in a dimension substantially perpendicular to the media-facing surface of the reader.

These and other features and aspects of various examples may be understood in view of the following detailed discussion and accompanying drawings.

DETAILED DESCRIPTION

Figure 1:
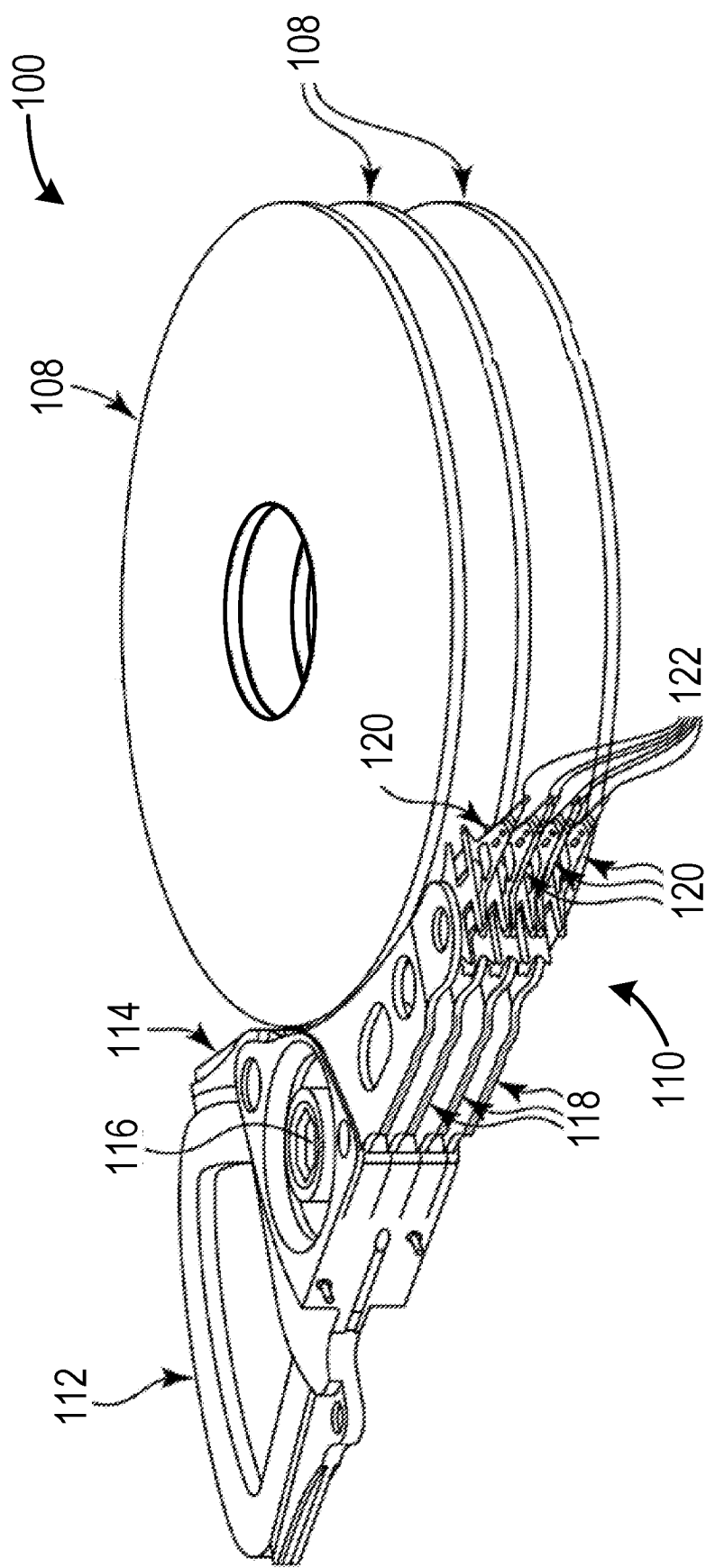
FIG. 1 is a perspective view of an example hard disk drive, in accordance with aspects of this disclosure.

FIG. 1 is a perspective view of an example hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a magnetic recording head configured to read data from and write data to a surface of a respective magnetic disk 108. In one example, each magnetic recording head includes a writer, a reader, and a heater (e.g., a reader heater, a writer heater).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
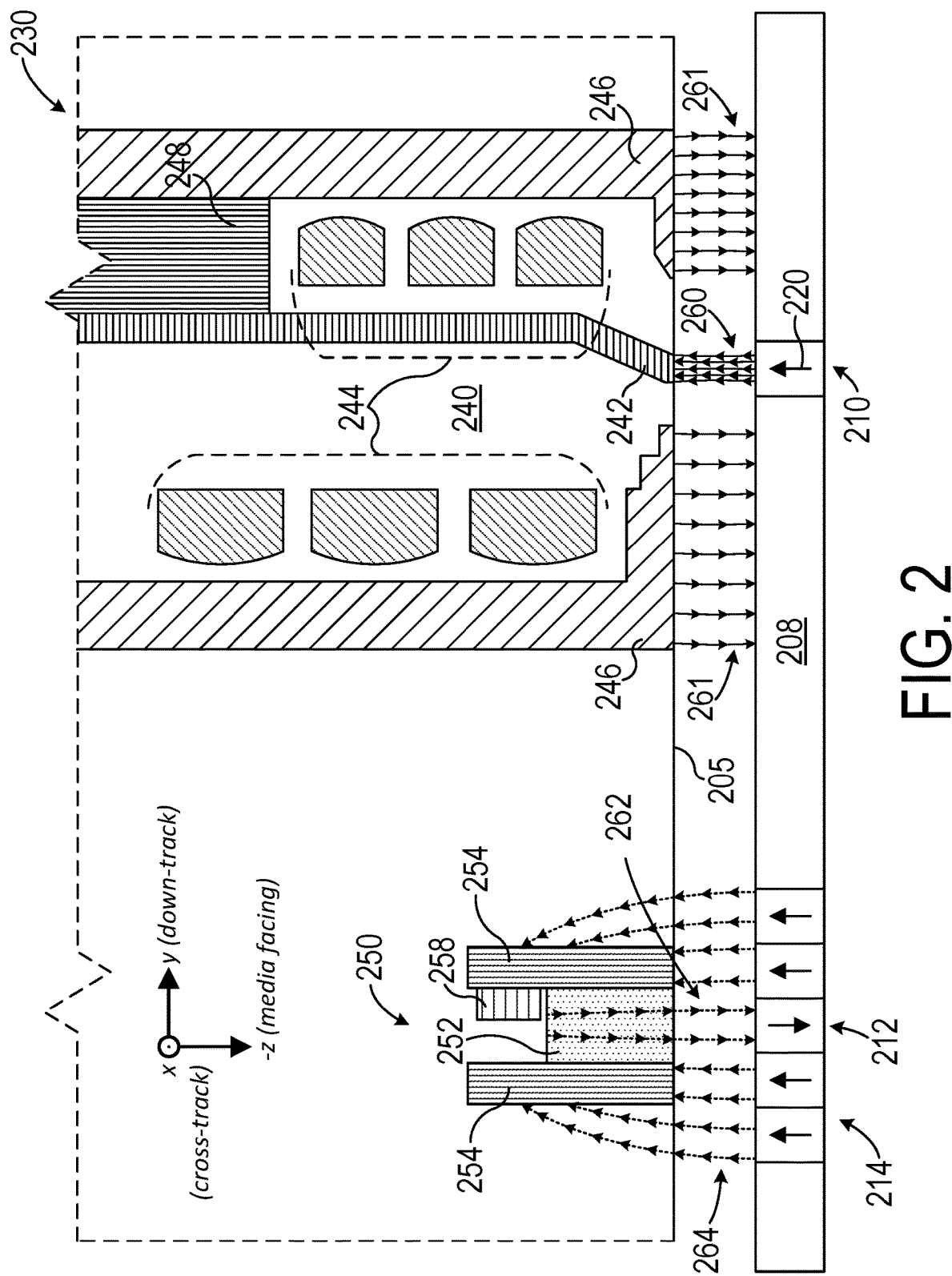
FIG. 2 is a cross-sectional view of an example magnetic recording head, in accordance with aspects of this disclosure.

FIG. 2 is a cross-sectional view of an example magnetic recording head, in accordance with aspects of this disclosure. Recording head 230 includes a writer 240 and a reader 250. Recording head 230 is disposed proximate to a magnetic disk 208 during read and write operations of an HDD (e.g., HDD 100 of FIG. 1). In the example of FIG. 2, a media-facing surface 205 of recording head 230 is held proximate to and faces magnetic disk 208. In some examples, media-facing surface 205 is an air-bearing surface configured to maintain recording head 230 at a target spacing (e.g., a head-media spacing) from a surface of magnetic disk 208 during some operations of HDD 100.

Writer 240 includes a write pole 242, writer coils 244, return poles 246, and a yoke 248. A drive controller (not shown) may output an electrical current through writer coils 244, which are configured to carry the electrical current and induce a magnetic field in write pole 242. Write pole 242 is configured to emit a magnetic field produced by writer coils 244 toward a surface of a magnetic disk 208. A part of write pole 242 is provided on or proximate to media-facing surface 205 of recording head 230. The magnetic field may be returned to recording head 230 through return pole(s) 246. The magnetic field returns to recording head 230 through return pole(s) 246 and is then be directed back to write pole 242 through a channel such as yoke 248.

Write pole 242 emits a magnetic field that includes a focused (e.g. high flux) magnetic field 260 and an unfocused (e.g. low flux) magnetic field 261. Focused magnetic field 260 is sufficiently strong to orient grains of small areas of magnetic disk 208 into bits of data which are stored for later retrieval. A stored data bit 210 of magnetic disk 208, for example, has a magnetic moment 220 that aligns with the magnetic orientation of focused magnetic field 260. Unfocused magnetic field 261 is returned to writer 240 through return poles 246 and are not strong enough to orient grains of magnetic disk 208. A magnetic moment 220 of stored data bit 210 and magnetic moments of other data bits may therefore be maintained for later retrieval by reader 250.

In accordance with aspects of this disclosure, reader 250 includes a sensor stack 252, shields 254, and a bridge 258. Reader 250 is configured to sense stored bits of data on magnetic disk 208 and direct signals indicative of the data to electronics (e.g., a controller) of HDD 100 for processing and decoding. Sensor stack 252 is configured to respond to magnetic fields produced by stored bits of data on magnetic disk 208. For example, magnetic disk 208 includes stored data bits 212 and 214. Stored data bits 212 and 214 are associated with magnetic moments, as indicated by the arrows in stored data bits 212 and 214. The magnetic moment of stored data bit 212 produces a magnetic field 262. In the example of FIG. 2, reader 250 is suspended above (in the +z direction) stored data bit 212, indicating that stored data bit 212 is being read by reader 250 at the time represented in FIG. 2. Sensor stack 252 responds to magnetic field 262 and directs a signal which includes the magnetic orientation data of stored data bit 212 to the HDD electronics (e.g., to a channel). Stored data bits 214, on the other hand, are not aligned below sensor stack 252 and are therefore not intended to be read by reader 250 at the time represented in FIG. 2. In practice, however, sensor stack 252 may receive some flux of a magnetic field 264 of stored data bits 214 and/or flux from magnetic fields of stored data bits on adjacent tracks (not shown).

Sensor stack 252 may include a magnetoresistive structure such as a giant magnetoresistance (GMR) junction or a tunneling magnetoresistance (TMR) junction. In these examples, an orientation of a magnetic moment of one or more layers of sensor stack 252 affects a current through and/or a voltage across sensor stack 252. For example, sensor stack 252 may include a free layer in which a magnetic moment of the free layer (e.g., the cumulative magnetic moments of the constituent atoms) rotates in response to an external magnetic field (e.g., magnetic field 262 from stored data bit 212). The relative orientation the magnetic moments of the free layer and one or more other layers of sensor stack 252, such as a synthetic antiferromagnetic (SAF) structure and/or a pinned layer, may change the resistivity of sensor stack 252. Thus, the orientation of a magnetic moment of a stored data bit on magnetic disk 208 may affect the voltage or current that is measured across or through sensor stack 252, such that the voltage and/or current may be processed as data signals by the HDD.

Shields 254 are configured to block extraneous magnetic fields from reaching sensor stack 252. In this way, sensor stack 252 may better detect and resolve the field from a stored data bit that sensor stack 252 is reading. For example, adjacent stored data bits 214 produce magnetic fields 264 that are associated with their respective magnetic moments (e.g., the arrows in stored data bits 214). In some examples, one or both of shields 254 include a material with high magnetic permeability, enabling shields 254 to absorb flux from fields such as magnetic fields 264. Shielding sensor stack 252 from external magnetic fields and/or magnetic fields associated with adjacent stored data bits may provide reader 250 with higher signal-to-noise ratio (SNR) and may enable reader 250 to better resolve stored data from bits from magnetic disk 208.

Bridge 258 is disposed above sensor stack 252 relative to media-facing surface 205 of recording head 230 and adjacent to a shield 254. Bridge 258 is configured to align magnetic moments of side shields (not shown).

Figure 3:
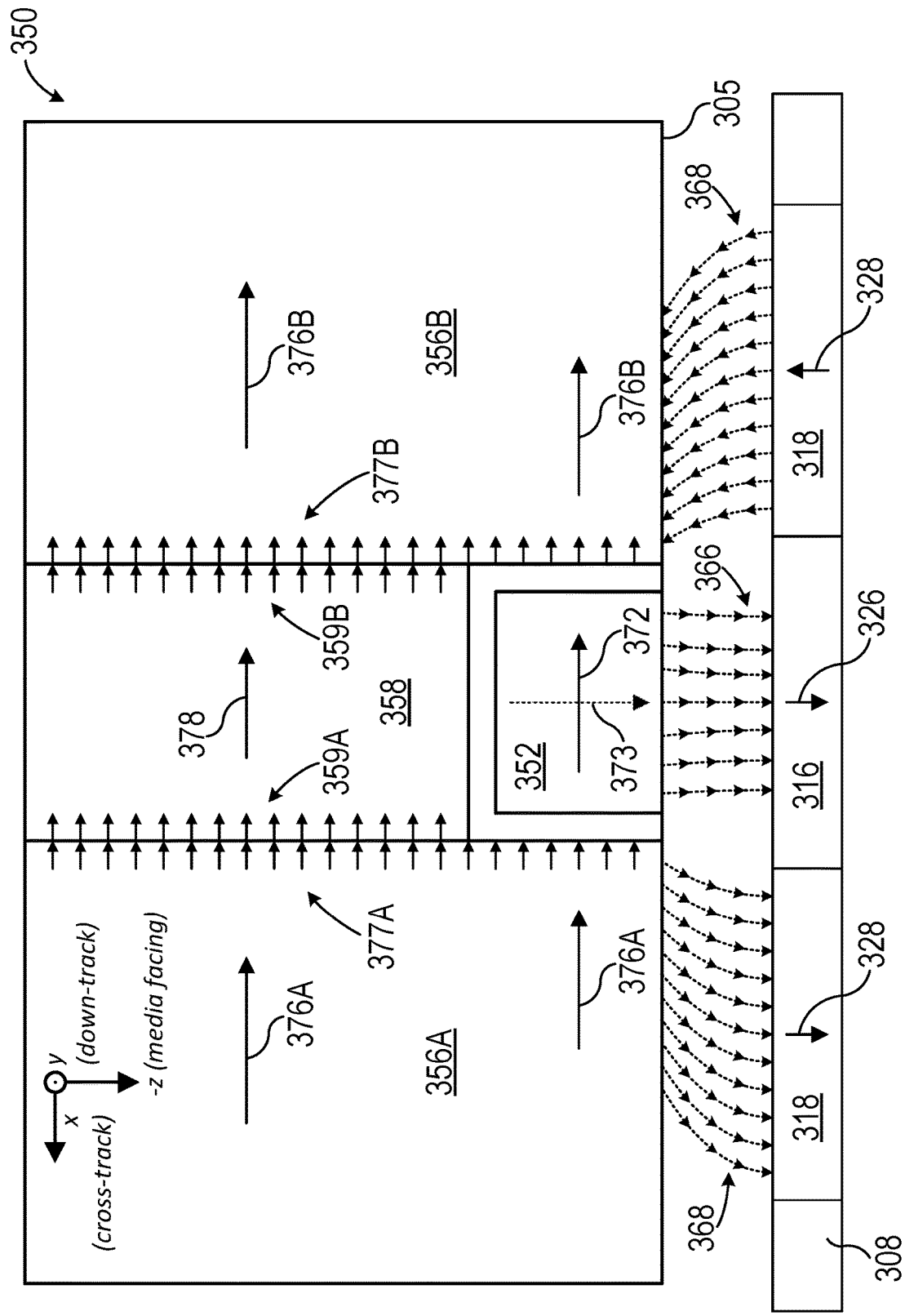
FIG. 3 is a cross-sectional view of an example reader of a magnetic recording head, in accordance with aspects of this disclosure.

FIG. 3 is a cross-sectional view of an example reader of a magnetic recording head, in accordance with aspects of this disclosure. Reader 350 of FIG. 3 may be an example of reader 250 of FIG. 2.

In accordance with aspects of this disclosure, reader 350 includes a sensor stack 352, a first side shield 356A and a second side shield 356B disposed on opposite sides of sensor stack 352 in a cross-track (x) dimension, and a bridge 358. Bridge 358 is disposed above sensor stack 352 relative to a media-facing surface 305 of reader 350 and proximate to first side shield 356A and second side shield 356B.

In the example of FIG. 3, reader 350 is suspended above (in the +z direction) a magnetic disk 308. Magnetic disk 308 includes data tracks 316 and 318 (on track and adjacent tracks, respectively). Each of data tracks 316 and 318 may have written bits of data, with each bit of data having an associated magnetic moment. For example, a bit of data on data track 316 has a magnetic moment 326, and bits of data on data tracks 318 have magnetic moments 328. Magnetic moments 326 and 328 are oriented substantially parallel to the −z (media facing) direction and substantially orthogonal to the x (cross-track) and y (down-track) directions. Each of magnetic moments 326 and 328 of written data bits on data tracks 316 and 318 produces an associated magnetic field (or flux). Magnetic moment 326 of data track 316, for example, produces a magnetic field 366, and magnetic moments 328 produce magnetic fields 368.

In the example of FIG. 3, sensor stack 352 is aligned with data track 316 such that it intersects magnetic field 366 from magnetic moment 326 of an associated data bit on data track 316. Sensor stack 352 acquires a magnetic moment 373 in response to magnetic field 366. That is, magnetic moment 373 aligns and becomes substantially parallel to magnetic field 366 and magnetic moment 326. Magnetic moment 373 may be acquired in a specific layer or layers of sensor stack 352, such as in a free layer. A free layer may include a material or materials in which the magnetic moments of the constituent atoms and/or molecules are able to rotate in the presence of a magnetic field, thus producing a net magnetic moment that aligns with the magnetic moment of the written bit of data on the associated magnetic disk. Other layer(s) of sensor stack 352 may have magnetic moments which are pinned to a particular orientation and/or have coercivities which exceed the field strength associated with magnetic field 366. For example, a sensor stack 352 may include an antiferromagnetic (AFM) layer and/or a synthetic antiferromagnetic (SAF) structure in which the associated magnetic moments are oriented and do not rotate in response to magnetic fields associated with data bits of magnetic disk 308. In the example of a magnetoresistance junction (e.g., a TMR or GMR junction), relative reorientation of magnetic moments of layers of sensor stack 352 (e.g., the change in orientation of the free layer relative to a SAF structure) changes the electrical resistance through sensor stack 352. This change may be detected as a voltage change or current change which can then be processed and translated into a read signal by the HDD (e.g., HDD 100 of FIG. 1).

Side shields 356A and 356B (collectively, side shields 356) are configured to block extraneous magnetic fields (e.g., fields from adjacent tracks, fields from other sources in HDD 100, fields external to HDD 100) from reaching and affecting sensor stack 352. Side shields 356 may include one or more soft magnetic materials. Soft magnetic materials typically have high magnetic permeability and low coercivity. Coercivities of soft magnetic materials are typically from on the order of 0.1 ampere per meter (A/m) to on the order of 100 A/m. In some examples, a coercivity of a soft magnetic material is less than 1000 A/m. The high magnetic permeability and low coercivity of a soft magnetic material enables it to readily magnetize and dissipate magnetic flux in response to an external applied magnetic field. This property may benefit side shields 356A and 356B by enabling them to dissipate extraneous magnetic fields and reduce the effect of extraneous magnetic fields on sensor stack 352. Examples of soft magnetic materials include nickel, iron, cobalt, chromium, and/or combinations thereof. In some examples, a soft magnetic material includes nickel, iron, cobalt, chromium, or combinations thereof.

The inclusion of a soft magnetic material in side shields 356 may enable side shields 356 to attenuate extraneous magnetic fields (e.g., magnetic fields from adjacent data tracks, external magnetic fields) and prevent extraneous magnetic fields from affecting the magnetic moment of sensor stack 352. In the example of FIG. 3, side shields 356 attenuate magnetic fields 368 of magnetic moments 328 to reduce the effect of magnetic fields 368 on sensor stack 352. Such shielding may reduce the likelihood that magnetic fields 368 will affect the signal sensed by sensor stack 352, which may increase the cross-track resolution and/or SNR of reader 350.

Additionally, side shields 356 are configured to apply a magnetic bias to sensor stack 352 (e.g., a free layer of sensor stack 352). That is, side shields 356 have associated magnetic moments, and a magnetic moment of sensor stack 352 aligns to the magnetic moments of side shield 356 to maintain a reference baseline in the absence of magnetic fields. Specifically, side shields 356A and 356B have magnetic moments 376A and 376B, respectively. In the absence of external magnetic fields, sensor stack 352 maintains a magnetic moment 372 that is substantially aligned with magnetic moments 376A and 376B. In the presence of a magnetic field (e.g., magnetic field 366 from data track 316), the magnetic moment of sensor stack 352 may rotate from the reference orientation of magnetic moment 372.

In some examples, magnetic moments 376A and 376B (collectively, magnetic moments 376) of side shields 356 may become canted, or tilted, relative to their baseline orientation of being aligned substantially parallel to the cross-track (x) direction of FIG. 3. Canting of one or both of magnetic moments 376 may result from charge accumulation and field or flux inhomogeneity along inner edges of side shields 356 (e.g., those edges facing sensor stack 352). Canting of magnetic moments 376 may affect the magnetic field which biases baseline magnetic moment 372 of sensor stack 352. For example, canting of magnetic moments 376 may cause magnetic moment 372 to also become canted, which may negatively affect the ability of sensor stack 352 to read the magnetic field from a written data bit on a magnetic disk. That is, an undesired rotation of magnetic moment 372 from its baseline state may change the current and/or voltage response of sensor stack 352 and reduce its ability to resolve a magnetic field from a stored data bit on magnetic disk 308.

Canting of magnetic moments 376 may change unpredictably due to external fields, magnetic fields, thermal fluctuations, and/or other effects. These changes may shift the canting between metastable states, or states where the configuration energy is at a local minimum but in which energy from fields and/or thermal effects may be sufficient to change the canting and switch another metastable state. The impact of such metastable states of canting of magnetic moments 376 of side shields 356 may result in jumps and instability in the response of sensor stack 352. That is, a sudden change in canting orientation of magnetic moments 376 during a read cycle of HDD 100 may be reflected the orientation of a magnetic moment of sensor stack 352 in response to a magnetic field, and thus resolution of a stored data bit by reader 350 may be reduced or lost.

In some instances, the effect of canting of magnetic moments 376 on sensor stack 352 may increase the variation in the directional and magnitude response of sensor stack 352 to an external magnetic field. This response is known as the transfer curve. Specifically, canting of magnetic moments 376 may apply a magnetic field component to sensor stack 352 that is orthogonal to the baseline magnetic moment 372. This additional component may increase a directionally asymmetric response of sensor stack 352 to an external magnetic field such as a magnetic field from a stored data bit. This directionally asymmetric response of sensor stack 352 is known as reader asymmetry. Variation in asymmetry across readers of a given design due to side shield canting may necessitate design aspects which reduce the ability of the magnetic moment of sensor stack 352 to rotate, such as increasing the strength of the bias on sensor stack 352. However, these aspects may also reduce to ability of a magnetic moment of sensor stack 352 to rotate in response to a magnetic field, and therefore side shield canting may have an impact on reader SNR.

Bridge 358 is configured to align magnetic moments of first side shield 356A and second side shield 356B. Specifically, magnetic flux may be transferred between side shields 356 across bridge 358 so that magnetic moments 376A and 376B may remain better aligned to each other, which may reduce canting by eliminating metastable states. Transfer of magnetic flux across bridge 358 may be enabled by including a soft magnetic material in bridge 358. That is, the soft magnetic material of bridge 358 may have a magnetic permeability that is sufficiently high to enable magnetic moments 376 of side shields 356 to produce a high magnetic flux density in bridge 358 (e.g., a magnetic flux density greater than or equal to about 0.5 Tesla). In some examples, bridge 358 includes at least one of nickel, iron, cobalt, or chromium. Bridge 358 may include the same soft magnetic material as side shields 356 or may include a different soft magnetic material than side shields 356. In some instances, bridge 358 and side shields 356 include different materials.

In the example of FIG. 3, local magnetic moments 377A and 377B along edges of side shields 356A and 356B, respectively, align to local magnetic moments 359A and 359B of bridge 358, respectively. Such alignment is enabled through transmission of flux through bridge 358 and may maintain the alignment of cumulative magnetic moments 376A, 378, and 376B of side shield 356A, bridge 358, and side shield 356B, respectively. Maintaining this alignment across bridge 358 may reduce or eliminate the magnetically canted metastable states in side shields 356 and their impact on sensor stack 352. Therefore, including bridge 358 in reader 350 may reduce or eliminate some sources of noise and instability in reader 350, potentially providing reader 350 with better SNR and enabling better resolution of stored data bits on a magnetic disk. Additionally, minimizing or eliminating field canting in side shields 356A and 356B by including bridge 358 may reduce transfer curve asymmetry variation from reader to reader (e.g., readers built on the same wafer during manufacturing, readers of a specific design), potentially enabling reader design aspects that increase amplitude and/or SNR.

Figure 4:
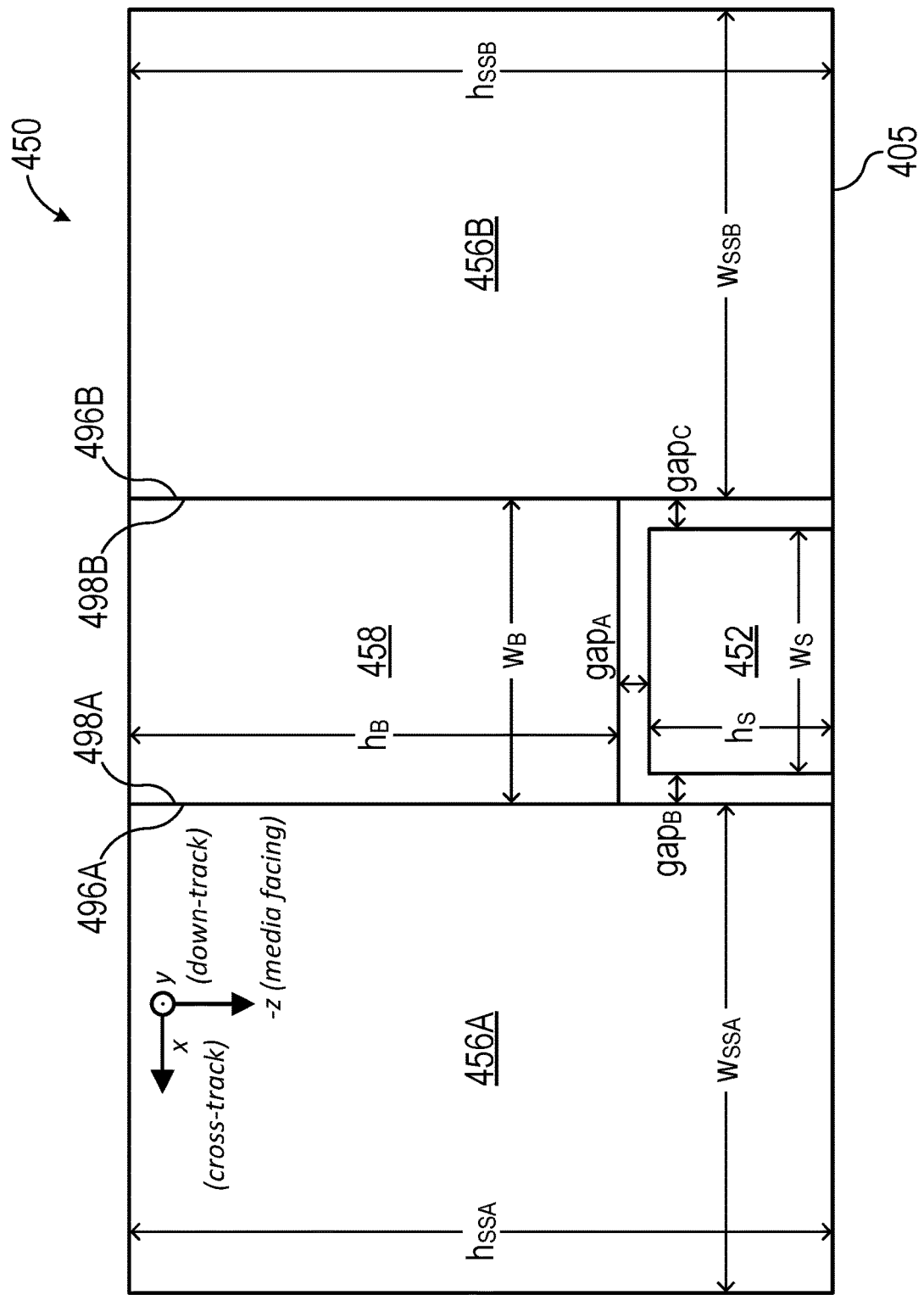
FIG. 4 is a cross-sectional view of an example reader of a magnetic recording head, in accordance with aspects of this disclosure.

FIG. 4 is a cross-sectional view of an example reader of a magnetic recording head, in accordance with aspects of this disclosure. Reader 450 of FIG. 4 may be an example of reader 250 of FIG. 2 as viewed along the up-track (−y) direction.

Reader 450 includes a sensor stack 452, a first side shield 456A and a second side shield 456B disposed on opposite sides of sensor stack 452 in a cross-track (x) dimension, and a bridge 458 configured to align magnetic moments of first side shield 456A and second side shield 456B. Bridge 458 is disposed above sensor stack 452 relative to a media-facing surface 405 of reader 450 and between first side shield 456A and second side shield 456B. In the example of FIG. 4, bridge 458 is separated from sensor stack 452 by a $gap_A$ in a dimension substantially perpendicular to media-facing surface 405 of reader 450. Side shields 456A and 456B are separated from sensor stack 452 by $gap_B$ and $gap_C$, respectively, in a dimension substantially parallel to media-facing surface 405 of reader 450.

A first surface 498A of bridge 458 is coupled to a surface 496A of first side shield 456A. A second surface 498B of bridge 458 is opposite first surface 498A. Surface 498B is coupled to a surface 496B of second side shield 456B.

In some examples, bridge 458 has a width $w_B$ greater than about 10 nm and a height $h_B$ greater than about 10 nm. In some examples, first side shield 456A and second side shield 456B have widths $w_{ssA}$ and $w_{ssB}$, respectively, greater than about 10 nm and heights $h_{ssA}$ and $h_{ssB}$, respectively, greater than about 10 nm. In some examples, sensor stack has a width $w_s$ greater than about 10 nm and a height $h_s$ greater than about 10 nm.

Surface 498A of bridge 458 may be substantially parallel to surface 496A of first side shield 456A. Surface 498A may be substantially orthogonal to media-facing surface 405 of reader 450. In some examples, surface 498B of bridge 458 is substantially parallel to surface 496B of second side shield 456B. Surface 498A of bridge 458 may be substantially parallel to surface 498B of bridge 458. In some examples, surfaces 498A and 498B of bridge 458 are substantially orthogonal to media-facing surface 405 of the reader 450.

Figure 5:
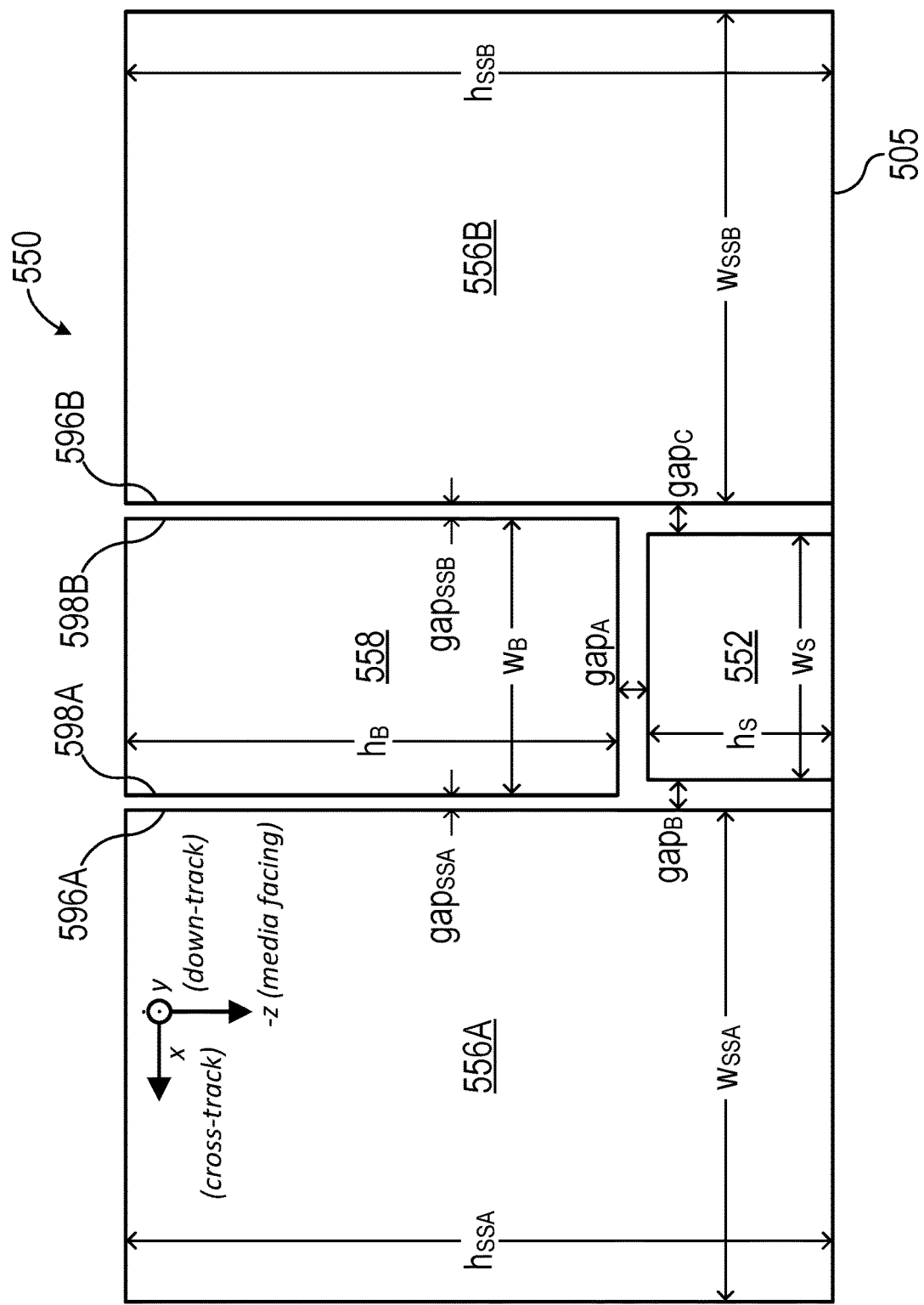
FIG. 5 is a cross-sectional view of an example reader of a magnetic recording head, in accordance with aspects of this disclosure.

FIG. 5 is a cross-sectional view of an example reader of a magnetic recording head, in accordance with aspects of this disclosure. Reader 550 of FIG. 5 may be an example of reader 250 of FIG. 2 as viewed along the up-track (−y) direction.

Reader 550 includes a sensor stack 552, a first side shield 556A and a second side shield 556B disposed on opposite sides of sensor stack 552 in a cross-track (x) dimension, and a bridge 558 configured to align magnetic moments of first side shield 556A and second side shield 556B. Bridge 558 is disposed above sensor stack 552 relative to a media-facing surface 505 of reader 550 and between first side shield 556A and second side shield 556B. Bridge 558 is separated from sensor stack 552 by a $gap_A$ in a dimension substantially perpendicular to media-facing surface 505 of reader 550. Side shields 556A and 556B are separated from sensor stack 552 by $gap_B$ and $gap_C$, respectively, in a dimension substantially parallel to media-facing surface 505 of reader 550.

A first surface 598A of bridge 558 and a surface 596A of first side shield 556A are separated by a $gap_{ssA}$. In some examples, a width of $gap_{ssA}$ is from about 0.05 to about 5 times a thickness of first side shield 556A in a down-track dimension of reader 550. A second surface 598B of bridge 558 and a surface 596B of second side shield 556B are separate by $gap_{ssB}$. In some examples, a width of $gap_{ssA}$ is from about 0.05 to about 5 times a thickness of first side shield 556A in a down-track dimension of reader 550 and a width of $gap_{ssB}$ is from about 0.05 to about 5 times a thickness of second side shield 556B in a down-track dimension of reader 550.

In some examples, bridge 558 has a width $w_B$ greater than about 10 nm and a height $h_B$ greater than about 10 nm. In some examples, first side shield 556A and second side shield 556B have widths $w_{ssA}$ and $w_{ssB}$, respectively, greater than about 10 nm and heights $h_{ssA}$ and $h_{ssB}$, respectively, greater than about 10 nm. In some examples, sensor stack 552 has a width $w_s$ greater than about 10 nm and a height $h_s$ greater than about 10 nm.

Surface 598A of bridge 558 may be substantially parallel to surface 596A of first side shield 556A. Surface 598A of bridge 558 may be substantially orthogonal to media-facing surface 505 of reader 550. Opposite surface 598B of bridge 558 may be substantially parallel to surface 596B of second side shield 556B. In some examples, surface 598A of bridge 558 is substantially parallel to surface 598B of bridge 558. Surfaces 598A and 598B of bridge 558 may be substantially orthogonal to media-facing surface 505 of reader 550.

Figure 6:
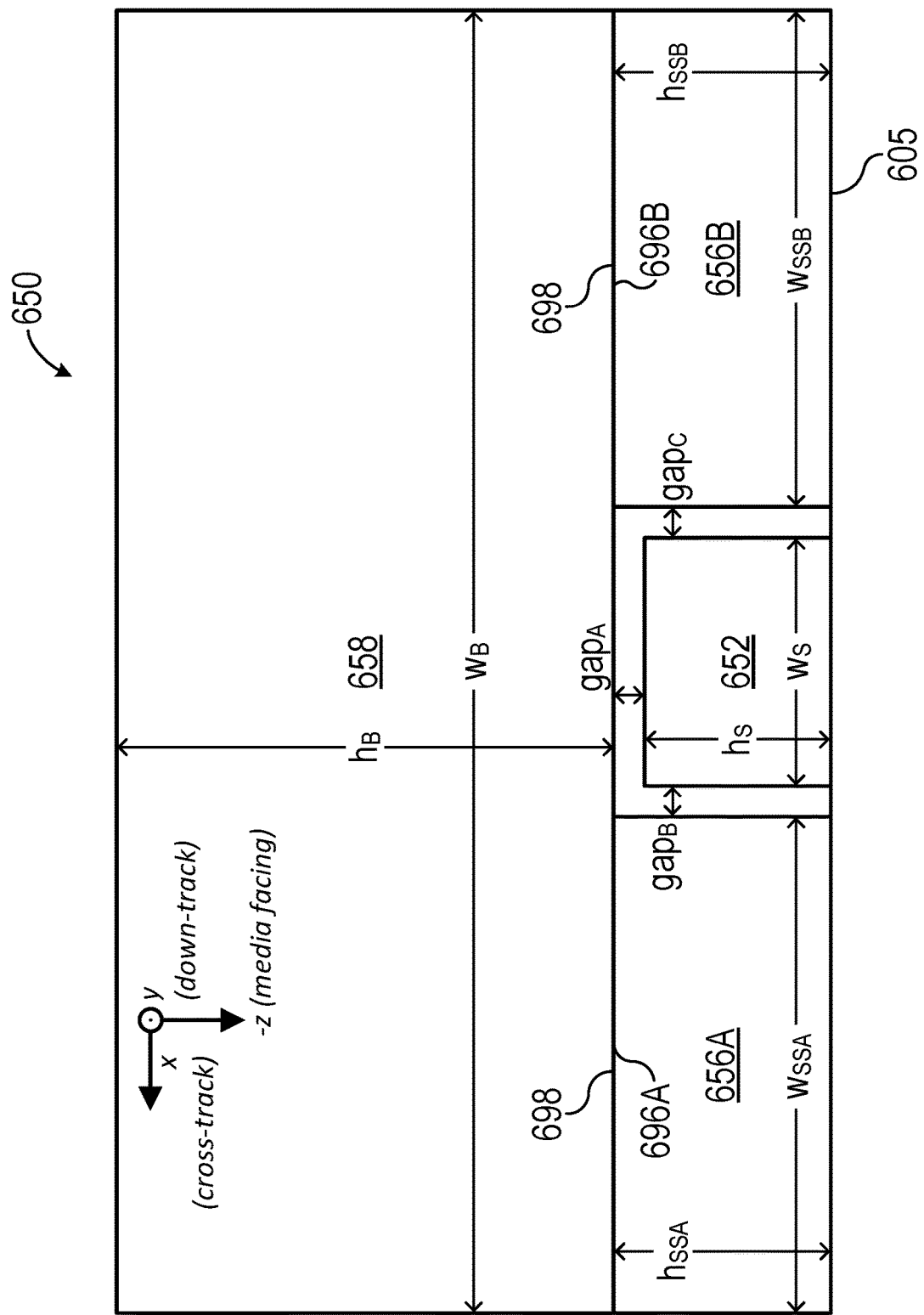
FIG. 6 is a cross-sectional view of an example reader of a magnetic recording head, in accordance with aspects of this disclosure.

FIG. 6 is a cross-sectional view of an example reader of a magnetic recording head, in accordance with aspects of this disclosure. Reader 650 of FIG. 6 may be an example of reader 250 of FIG. 2 as viewed along the up-track (−y) direction.

Reader 650 includes a sensor stack 652, a first side shield 656A and a second side shield 656B disposed on opposite sides of sensor stack 652 in a cross-track (x) dimension, and a bridge 658 configured to align magnetic moments of first side shield 656A and second side shield 656B. Bridge 658 is disposed above sensor stack 652, first side shield 656A, and second side shield 656B relative to a media-facing surface 605 of reader 650. Bridge 658 is separated from sensor stack 652 by a $gap_A$ in a dimension substantially perpendicular to media-facing surface 605 of reader 650. Side shields 656A and 656B are separated from sensor stack 652 by $gap_B$ and $gap_C$, respectively, in a dimension substantially parallel to media-facing surface 605 of reader 650.

A surface 698 of bridge 658 is coupled to a surface 696A of first side shield 656A and a surface 696B of second side shield 656B. Surface 698 of bridge 658 may be substantially parallel to media-facing surface 605 of reader 650. In some examples, surface 698 of bridge 658, surface 696A of first side shield 656A, and surface 696B of second side shield 656B are substantially parallel to media-facing surface 605 of reader 650.

In some examples, bridge 658 has a width $w_B$ greater than about 10 nm and a height $h_B$ greater than about 10 nm. In some examples, first side shield 656A and second side shield 656B have widths $w_{ssA}$ and $w_{ssB}$, respectively, greater than about 10 nm and heights $h_{ssA}$ and $h_{ssB}$, respectively, greater than about 10 nm. In some examples, sensor stack 652 has a width $w_s$ greater than about 10 nm and a height $h_s$ greater than about 10 nm.

Figure 7:
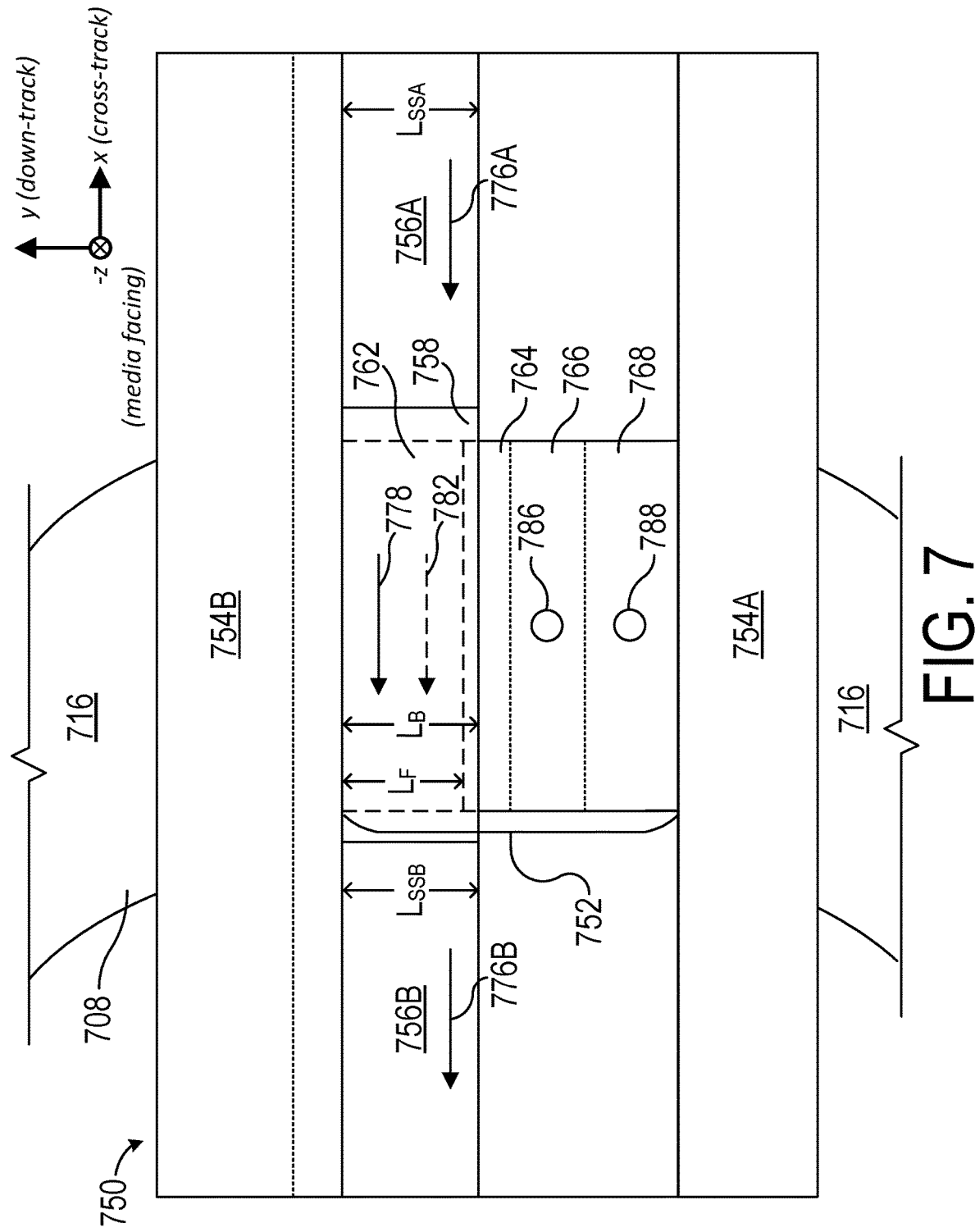
FIG. 7 is a top-down cross-sectional view of an example reader of a magnetic recording head, in accordance with aspects of this disclosure.

FIG. 7 is a top-down cross-sectional view of an example reader of a magnetic recording head, in accordance with aspects of this disclosure. Reader 750 of FIG. 7 may be an example of reader 250 of FIG. 2 as viewed along the media facing (−z) direction.

Reader 750 includes a sensor stack 752, a bottom shield 754A and a top shield 754B (collectively, shields 754), a first side shield 756A and a second side shield 756B (collectively, side shields 756), and a bridge 758. Shields 754 of FIG. 7 may be examples of shields 254 of reader 350 of FIG. 2. Reader 750 is suspended above a magnetic disk 708. Reader 750 is positioned such that sensor stack 752 aligns with a data track 716 of magnetic disk 708.

Sensor stack 752 of this example includes a tunneling magnetoresistance (TMR) junction. Other example sensor stacks may include other types of sensors (e.g., a GMR junction). Sensor stack 752 includes a free layer 762, a barrier layer 764, and a synthetic antiferromagnetic (SAF) layer 766. A magnetic moment 782 of free layer 762 may rotate in response to an applied magnetic field, for example a magnetic field from a written data bit on data track 716 of magnetic disk 708. In contrast, SAF layer 766 may have a magnetic moment 786 that remains in a substantially fixed orientation and does not rotate in response to a magnetic field. Sensor stack 752 may include a layer 768 that is an antiferromagnetic (AFM) layer or other type of pinning layer that also maintains a substantially fixed magnetic moment 788 and supports the orientation of magnetic moment 786 of SAF layer 766. In some examples, magnetic moments 786 and 788 are substantially parallel to a media facing (−z) dimension. Barrier layer 764 is configured to pass a tunneling current between SAF layer 766 and free layer 762, and thus through sensor stack 752. The resistance through sensor stack 752 changes with the relative orientations of magnetic moments of free layer 762, SAF layer 766, and, in some instances, layer 768. A change in resistance may be detected as a voltage change, and thus a change in resistance through sensor stack 752 that results from magnetic moment 782 of free layer 762 rotating in response to a magnetic field may be detected as a voltage change across sensor stack 752.

Bridge 758 of reader 750 is disposed above sensor stack 752 in the +z direction. Bridge 758 may be separated from sensor stack 752 by a gap (not shown) in the z dimension. Bridge 758 is disposed between first side shield 756A and second side shield 756B in a cross-track (x) dimension. In some examples, bridge 758 is coupled to first side shield 756A and/or second side shield 756B. In some examples, bridge 758 and first side shield 756A are separated by a gap in the cross-track (x) dimension. In some examples, bridge 758 and second side shield 756B are separated by a gap in the cross-track (x) dimension. In the example of FIG. 7, bridge 758 covers free layer 762 and part of barrier layer 764 when viewed along the media facing (−z) dimension. In other examples, bridge 758 may cover part or all of free layer 762, barrier layer 764, SAF layer 766, layer 768, and/or other layers of sensor stack 752 when viewed along the media facing (−z) dimension. In some examples, bridge 758 may cover part or all of side shields 756A and/or 756B when viewed along the media facing (−z) dimension (e.g., in the example of reader 650 of FIG. 6).

Bridge 758 has a length $L_B$ in a down-track (y) dimension. Side shields 756A and 756B have lengths $L_{SSA}$ and $L_{SSB}$, respectively, in the down-track (y) dimension. Free layer 762 of sensor stack 752 has a length $L_F$ in the down-track (y) dimension. In some examples, $L_B$ is less than $L_{ssA}$ and/or $L_{ssB}$. In some examples, $L_B$ is about the same as $L_{ssA}$ and/or $L_{ssB}$. In some examples, $L_B$ is greater than $L_{ssA}$ and/or $L_{ssB}$. In some examples, $L_B$ is less than $L_F$. In some examples, $L_B$ is about the same as $L_F$. In some examples, $L_B$ is greater than $L_F$.

Bridge 758 is configured to align magnetic moments 776A and 776B of first side shield 756A and second side shield 756B, respectively. That is, magnetic moments 776A and 776B may be substantially parallel to a magnetic moment 778 of bridge 758. Magnetic moments 776A and 776B of side shields 756A and 756B, respectively, may provide a magnetic bias for magnetic moment 782 of free layer 762. Bridge 758 may, in some examples, reduce or eliminate canting of magnetic moments 776A and 776B of side shields 756A and 756B, respectively. Reducing or eliminating canting of magnetic moments 776A and 776B may, in some scenarios, mitigate some sources of instability of reader 750 that result from asymmetric magnetic bias on free layer 762 and/or switching of magnetic bias resulting from switching of magnetic moments 776A and 776B between canted metastable states. Applying a more stable bias to free layer 762 by including bridge 758 may, in some examples, enable sensor stack 752 to provide a more consistent response to magnetic fields from stored data bits and thus may provide reader 750 with better resolution and/or SNR. Providing a more stable bias to free layer 762 by including bridge 758 may, in some instances, reduce asymmetry variation across readers and may enable reader designs that increase amplitude, SNR, cross-track resolution, and/or other reader performance characteristics.

What is claimed is:

1. A reader of a magnetic recording head, the reader comprising:
    a sensor stack;
    a first side shield and a second side shield disposed on opposite sides of the sensor stack in a cross-track dimension of the reader; and
    a bridge comprising a soft magnetic material having a magnetic permeability that is sufficiently high to enable magnetic moments of the first side shield and the second side shield to produce a magnetic flux density in the bridge that is greater than or equal to about 0.5 Tesla, the bridge configured to align magnetic moments of the first side shield and the second side shield, wherein the bridge is disposed above the sensor stack relative to a media-facing surface of the reader and proximate to the first side shield and the second side shield.

2. The reader of claim 1, wherein the bridge comprises at least one of nickel, iron, cobalt, or chromium.

3. The reader of claim 1, wherein a surface of the bridge is substantially parallel to a surface of the first side shield.

4. The reader of claim 3, wherein the surface of the bridge is substantially orthogonal to the media-facing surface of the reader.

5. The reader of claim 4,
wherein the surface of the bridge is a first surface of the bridge, and
wherein a second, opposite surface of the bridge is substantially parallel to a surface of the second side shield.

6. The reader of claim 5, wherein the first surface of the bridge is substantially parallel to the second, opposite surface of the bridge.

7. The reader of claim 6, wherein the first surface of the bridge and the second, opposite surface of the bridge are substantially orthogonal to the media-facing surface of the reader.

8. The reader of claim 1, wherein a surface of the bridge is coupled to a surface of the first side shield.

9. The reader of claim 8,
wherein the surface of the bridge is a first surface of the bridge, and
wherein a second, opposite surface of the bridge is coupled to a surface of the second side shield.

10. The reader of claim 1, wherein a surface of the bridge and a surface of the first side shield are separated by a gap.

11. The reader of claim 10, wherein a width of the gap is from about 0.05 to about 5 times a thickness of the first side shield in a down-track dimension of the reader.

12. The reader of claim 10,
wherein the gap is a first gap,
wherein a second surface of the bridge and a surface of the second side shield are separated by a second gap,
wherein a width of the first gap is from about 0.05 to about 5 times a thickness of the first side shield in a down-track dimension of the reader, an
wherein a width of the second gap is from about 0.05 to about 5 times a thickness of the second side shield in the down-track dimension of the reader.

13. The reader of claim 1, wherein the bridge has a width greater than about 10 nanometers and a height greater than about 10 nanometers.

14. The reader of claim 1, wherein the first side shield and the second side shield have widths greater than about 10 nanometers and heights greater than about 10 nanometers.

15. The reader of claim 1,
wherein a surface of the bridge is substantially parallel to the media-facing surface of the reader, and
wherein the surface of the bridge is coupled to a surface of the first side shield and a surface of the second side shield.

16. The reader of claim 15, wherein the surface of the bridge, the surface of the first side shield, and the surface of the second side shield are substantially parallel to the media-facing surface of the reader.

17. The reader of claim 15, wherein the bridge has a width greater than about 10 nanometers and a height greater than about 10 nanometers.

18. A reader of a magnetic recording head, the reader comprising:
a sensor stack;
a first side shield and a second side shield disposed on opposite sides of the sensor stack in a cross-track dimension; and
a bridge configured to align magnetic moments of the first side shield and the second side shield,
wherein the bridge is disposed above the sensor stack relative to a media-facing surface of the reader and between the first side shield and the second side shield, and
wherein the bridge is separated from the sensor stack by a gap in a dimension substantially perpendicular to the media-facing surface of the reader.

19. The reader of claim 18, wherein the sensor stack includes a free layer, a barrier layer, and a synthetic anti-ferromagnetic (SAF) layer stacked in a down-track dimension.

20. The reader of claim 19, wherein the bridge covers the free layer and at least a portion of the barrier layer when viewed from the media facing surface.

* * * * *